United States Patent
Liu (10) Patent No.: US 10,735,253 B2
(45) Date of Patent: Aug. 4, 2020

(54) ALARM INFORMATION REPORTING METHOD AND APPARATUS

(71) Applicant: Huawei Technologies Co., Ltd., Shenzhen, Guangdong (CN)

(72) Inventor: Jianning Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/287,354

(22) Filed: Feb. 27, 2019

(65) Prior Publication Data

US 2019/0199582 A1    Jun. 27, 2019

Related U.S. Application Data

(63) Continuation of application No. PCT/CN2016/097722, filed on Aug. 31, 2016.

(51) Int. Cl.
  *H04L 12/26* (2006.01)
  *H04L 12/24* (2006.01)
  *G06F 9/455* (2018.01)

(52) U.S. Cl.
  CPC ...... *H04L 41/0695* (2013.01); *G06F 9/45558* (2013.01); *H04L 41/0631* (2013.01);
  (Continued)

(58) Field of Classification Search
  CPC . G06F 2009/45591; G06F 2009/45595; G06F 9/45558; H04L 41/0631; H04L 41/0659; H04L 41/0695
  See application file for complete search history.

(56) References Cited

U.S. PATENT DOCUMENTS

| | | | | |
|---|---|---|---|---|
| 6,058,420 A | * | 5/2000 | Davies | ................ H04L 43/0805 709/224 |
| 2016/0224409 A1 | | 8/2016 | Liu et al. | |

(Continued)

FOREIGN PATENT DOCUMENTS

| | | |
|---|---|---|
| CN | 105337758 A | 2/2016 |
| CN | 105634785 B | 6/2016 |

(Continued)

OTHER PUBLICATIONS

ETSI GS NFV-REL 001 V1.1.1 "Network Functions Virtualisation (NFV); Resiliency Requirements",Group Specification, Jan. 2015. XP014235737. 82 pages.

(Continued)

*Primary Examiner* — Minh Trang T Nguyen
(74) *Attorney, Agent, or Firm* — Slater Matsil, LLP (57) ABSTRACT

An alarm information reporting method and apparatus are provided. The method is applied to an NFVI. A monitor is arranged at an NFVI hardware layer, a software layer includes a VNF virtual machine, and a monitor, an alarm classifier, and a virtual machine manager are arranged at the software layer. The method includes: detecting, by the monitor, physical resource alarm information and sending the physical resource alarm information to the alarm classifier; obtaining, by the alarm classifier, virtual machine information from the virtual machine manager based on the physical resource alarm information and sending the physical resource alarm information to an analog processor corresponding to the virtual machine information; and obtaining, by the analog processor, virtual resource alarm information based on the physical resource alarm information and reporting the physical resource alarm information and the virtual resource alarm information to a VNF in a virtual machine.

10 Claims, 6 Drawing Sheets

(52) U.S. Cl.
CPC .................... *H04L 41/0659* (2013.01); *G06F 2009/45591* (2013.01); *G06F 2009/45595* (2013.01)

(56) References Cited

U.S. PATENT DOCUMENTS

| | | | |
|---|---|---|---|
| 2016/0232072 A1 | 8/2016 | Skerry et al. | |
| 2017/0294112 A1* | 10/2017 | Kushnir | G08B 29/02 |
| 2018/0026833 A1 | 1/2018 | Zhu et al. | |

FOREIGN PATENT DOCUMENTS

| | | |
|---|---|---|
| CN | 105847025 A | 8/2016 |
| EP | 3024174 A1 | 5/2016 |
| WO | 2015042937 A1 | 4/2015 |
| WO | 2016093861 A1 | 6/2016 |
| WO | 2016112676 A1 | 7/2016 |

OTHER PUBLICATIONS

ETSI GS NFV-MAN 001 V1.1.1, Network Functions Virtualisation (NFV); Management and Orchestration,Group Specification, Dec. 2014. XP014235740. 184 pages.

* cited by examiner

ALARM INFORMATION REPORTING METHOD AND APPARATUS

CROSS-REFERENCE TO RELATED APPLICATIONS

This application is a continuation of International Application No. PCT/CN2016/097722, filed on Aug. 31, 2016. The disclosure of the aforementioned application is hereby incorporated by reference in the entity.

TECHNICAL FIELD

The present application relates to the field of network functions virtualization technologies, and in particular, to an alarm information reporting method and apparatus.

BACKGROUND

A virtualization technology is a resource management technology that enables various hardware resources of a computer, such as a server, a network, and a memory, to present after abstraction and conversion. This breaks down a barrier that hardware structures cannot be segmented, so that a user can apply these resources in a better manner than an original configuration. Virtualization functions of these resources are not limited by a setting manner, a location, or a physical configuration of an existing resource.

Currently, when an alarm event such as a fault occurs on a hardware resource, hardware resource monitors send alarm information to a virtualized infrastructure manager (VIM) that manages the hardware resource, and then the VIM forwards the alarm information to a virtual network function manager (VNFM) that manages a virtualization function. After receiving the alarm information, the VNFM performs corresponding processing based on a capability of the VNFM, and reports processed alarm information to an element manager (EM). The EM performs final fault processing in combination with other alarm information.

In the foregoing alarm information reporting process, the alarm information needs to pass through the managers VIM and VNFM on management planes of the hardware resource, the virtualization function, and the like, and then is reported to the EM. In this way, a reporting path is relatively long, and specified processing needs to be performed in the reporting process. As a result, an alarm information reporting latency is increased, the EM cannot obtain alarm information at a bottom layer in a timely manner to perform corresponding processing, and fast fault processing and recovery are affected.

SUMMARY

Embodiments of the present disclosure provide an alarm information reporting method and apparatus, to resolve prior-art problems of a long reporting path and a long reporting latency of alarm information.

The following technical solutions are used in the embodiments of the present disclosure to achieve the foregoing objective.

According to a first aspect, an alarm information reporting method is provided and is applied to a network functions virtualization infrastructure NFVI. The NFVI includes a hardware layer, a virtual layer, and a software layer running at the hardware layer, the software layer includes an analog processor, a virtual machine runs on the analog processor, the virtual machine includes a virtualized network function VNF, a monitor is arranged at the hardware layer, and a monitor, an alarm classifier, and a virtual machine manager are arranged at the software layer. The method includes: detecting, by the monitor, physical resource alarm information at the hardware layer and/or the software layer and sending the physical resource alarm information to the alarm classifier; obtaining, by the alarm classifier, corresponding virtual machine information from the virtual machine manager based on the physical resource alarm information; sending, by the alarm classifier based on the virtual machine information, the physical resource alarm information to an analog processor corresponding to the virtual machine information; and obtaining, by the analog processor, corresponding virtual resource alarm information based on the physical resource alarm information and reporting the physical resource alarm information and the virtual resource alarm information to a VNF in a virtual machine corresponding to the virtual machine information, so that the VNF reports the physical resource alarm information and the virtual resource alarm information to a corresponding element manager. In the foregoing technical solution, alarm information of hardware and/or software at a bottom layer of the NFVI, and associated virtual resource alarm information may be directly reported to the element manager by using the virtual machine, thereby shortening a reporting path. In this way, the element manager earlier obtains and processes the alarm information at the bottom layer in a timely manner, so as to avoid impact on an NFVI service as much as possible.

In a possible implementation, the physical resource alarm information includes a fault source identifier, and the obtaining, by the alarm classifier, corresponding virtual machine information from the virtual machine manager based on the physical resource alarm information includes: sending, by the alarm classifier, a query request to the virtual machine manager, where the query request includes the fault source identifier; and querying, by the virtual machine manager, corresponding virtual machine information from first correspondence information based on the fault source identifier and sending the virtual machine information to the alarm classifier, where the first correspondence information includes at least one piece of physical resource information and virtual machine information corresponding to each piece of physical resource information, and the virtual machine information includes a virtual machine identifier. In the foregoing possible technical solution, when obtaining the corresponding virtual machine information by using the virtual machine manager, the alarm classifier may obtain the corresponding virtual machine information by using a method for sending the query request, so that the corresponding virtual machine information can be obtained quickly and effectively.

In a possible implementation, the virtual machine information further includes a back-end alarm driver identifier; at least one back-end alarm driver and a front-end alarm driver of a virtual machine corresponding to each back-end alarm driver are arranged on the analog processor; correspondingly, the sending, by the alarm classifier based on the virtual machine information, the physical resource alarm information to an analog processor corresponding to the virtual machine information includes: sending, by the alarm classifier, the physical resource alarm information to a back-end alarm driver in the analog processor corresponding to the back-end alarm driver identifier based on the back-end alarm driver identifier; and correspondingly, the obtaining, by the analog processor, corresponding virtual resource alarm information based on the physical resource alarm information and reporting the physical resource alarm information and the virtual resource alarm information to a VNF in a virtual machine corresponding to the virtual machine information, so that the VNF reports the physical resource alarm information and the virtual resource alarm information to a corresponding element manager includes: obtaining, by the back-end alarm driver, the corresponding virtual resource alarm information from the analog processor based on the physical resource alarm information, sending, by the back-end alarm driver, the physical resource alarm information and the virtual resource alarm information to a front-end alarm driver in a corresponding virtual machine, and reporting, by the front-end alarm driver, the physical resource alarm information and the virtual resource alarm information to the VNF in the virtual machine corresponding to the virtual machine identifier, so that the VNF reports the physical resource alarm information and the virtual resource alarm information to the corresponding element manager. In the foregoing possible technical solution, a back-end alarm driver is added to the analog processor, a front-end alarm driver is added to the virtual machine, and there is a one-to-one correspondence between the back-end alarm driver and the front-end alarm driver, so that corresponding alarm information can be reported to the element manager along a preset transmission channel, and an alarm information reporting latency is reduced.

According to a second aspect, an alarm information reporting method is provided and is applied to a network functions virtualization infrastructure NFVI. The NFVI includes a hardware layer, a virtual layer, an adapter, and a software layer running at the hardware layer, the software layer includes a virtual machine, the virtual machine includes a virtualized network function VNF, a monitor is arranged at the hardware layer, and a monitor, an alarm classifier, and a virtual machine manager are arranged at the software layer. The method includes: detecting, by the monitor, physical resource alarm information at the hardware layer and/or the software layer and sending the physical resource alarm information to the alarm classifier; obtaining, by the alarm classifier, corresponding virtual machine information from the virtual machine manager based on the physical resource alarm information and obtaining virtual resource alarm information corresponding to the physical resource alarm information; sending, by the alarm classifier, the physical resource alarm information, the virtual resource alarm information, and the virtual machine information to the adapter based on the virtual machine information; and sending, by the adapter based on the virtual machine information, the physical resource alarm information and the virtual resource alarm information to a VNF in a virtual machine corresponding to the virtual machine information, so that the VNF reports the physical resource alarm information and the virtual resource alarm information to a corresponding element manager. In the foregoing technical solution, alarm information of hardware and/or software at a bottom layer of the NFVI, and associated virtual resource alarm information may be rapidly reported to the element manager by using the adapter, thereby shortening a reporting path. In this way, the element manager earlier obtains and processes the alarm information at the bottom layer in a timely manner, so as to avoid impact on an NFVI service as much as possible.

In a possible implementation, the physical resource alarm information includes a fault source identifier, and the obtaining, by the alarm classifier, corresponding virtual machine information from the virtual machine manager based on the physical resource alarm information includes: sending, by the alarm classifier, a query request to the virtual machine manager, where the query request includes the fault source identifier; and querying, by the virtual machine manager, corresponding virtual machine information from second correspondence information based on the fault source identifier and sending the virtual machine information to the alarm classifier, where the second correspondence information includes at least one piece of physical resource information and virtual machine information corresponding to each piece of physical resource information. In the foregoing possible technical solution, when obtaining the corresponding virtual machine information by using the virtual machine manager, the alarm classifier may obtain the corresponding virtual machine information by using a method for sending the query request, so that the corresponding virtual machine information can be obtained quickly and effectively.

In a possible implementation, the virtual machine information includes a virtual machine identifier and a selector identifier; the adapter includes a selector; and correspondingly, the sending, by the alarm classifier, the physical resource alarm information, the virtual resource alarm information, and the virtual machine information to the adapter based on the virtual machine information includes: sending, by the alarm classifier, the physical resource alarm information, the virtual resource alarm information, and the virtual machine information to a selector, in the adapter, corresponding to the selector identifier based on the selector identifier. In the foregoing possible technical solution, the alarm classifier may send corresponding alarm information and the like to the selector corresponding to the selector identifier by using the selector identifier in the virtual machine information, so that the selector can quickly report the corresponding alarm information.

In a possible implementation, the adapter further includes at least one virtual function VF; each VF is corresponding to one VF driver; and correspondingly, the sending, by the adapter based on the virtual machine information, the physical resource alarm information and the virtual resource alarm information to a VNF in a virtual machine corresponding to the virtual machine information, so that the VNF reports the physical resource alarm information and the virtual resource alarm information to a corresponding element manager includes: obtaining, by the selector, a target VF corresponding to the virtual machine identifier from third correspondence information based on the virtual machine identifier and sending the physical resource alarm information and the virtual resource alarm information to the target VF, where the third correspondence information includes at least one VF and a virtual machine identifier corresponding to each VF, sending, by the target VF, the physical resource alarm information and the virtual resource alarm information to a VF driver corresponding to the target VF, and reporting, by the VF driver corresponding to the target VF, the physical resource alarm information and the virtual resource alarm information to the VNF in the virtual machine corresponding to the virtual machine identifier, so that the VNF reports the physical resource alarm information and the virtual resource alarm information to the corresponding element manager. In the possible implementation, the selector selects a corresponding VF, and the alarm information is reported to the element manager by using the preset VF-VF driver channel, so that the element manager earlier obtains the alarm information at the bottom layer, so as to avoid impact on an NFVI service as much as possible.

According to a third aspect, an alarm information reporting apparatus is provided, where the apparatus includes a monitor, an alarm classifier, a virtual machine manager, an analog processor, a virtual machine, and the virtual machine includes a virtualized network function VNF; the monitor is configured to: detect physical resource alarm information at a hardware layer and/or a software layer of the alarm information reporting apparatus, and send the physical resource alarm information to the alarm classifier; the alarm classifier is configured to obtain corresponding virtual machine information from the virtual machine manager based on the physical resource alarm information; the alarm classifier is further configured to send, based on the virtual machine information, the physical resource alarm information to an analog processor corresponding to the virtual machine information; and the analog processor is configured to: obtain corresponding virtual resource alarm information based on the physical resource alarm information, and report the physical resource alarm information and the virtual resource alarm information to a VNF in a virtual machine corresponding to the virtual machine information, so that the VNF reports the physical resource alarm information and the virtual resource alarm information to a corresponding element manager.

In a possible implementation, the physical resource alarm information includes a fault source identifier; the alarm classifier is specifically configured to send a query request to the virtual machine manager, where the query request includes the fault source identifier; and the virtual machine manager is configured to: query corresponding virtual machine information from first correspondence information based on the fault source identifier, and send the virtual machine information to the alarm classifier, where the first correspondence information includes at least one piece of physical resource information and virtual machine information corresponding to each piece of physical resource information, and the virtual machine information includes a virtual machine identifier.

In a possible implementation, the virtual machine information further includes a back-end alarm driver identifier; at least one back-end alarm driver and a front-end alarm driver of a virtual machine corresponding to each back-end alarm driver are arranged on the analog processor; correspondingly, the alarm classifier is further specifically configured to send the physical resource alarm information to a back-end alarm driver in the analog processor corresponding to the back-end alarm identifier based on the back-end alarm driver identifier; correspondingly, the back-end alarm driver is configured to obtain the corresponding virtual resource alarm information from the analog processor based on the physical resource alarm information; the back-end alarm driver is further configured to send the physical resource alarm information and the virtual resource alarm information to a front-end alarm driver in a corresponding virtual machine; and the front-end alarm driver is configured to report the physical resource alarm information and the virtual resource alarm information to the VNF in the virtual machine corresponding to the virtual machine identifier, so that the VNF reports the physical resource alarm information and the virtual resource alarm information to the corresponding element manager.

According to a fourth aspect, an alarm information reporting apparatus is provided, where the apparatus includes a monitor, an alarm classifier, a virtual machine manager, an adapter, and a virtual machine, the virtual machine includes a virtualized network function VNF; the monitor is configured to: detect physical resource alarm information at a hardware layer and/or a software layer of the alarm information reporting apparatus, and send the physical resource alarm information to the alarm classifier; the alarm classifier is configured to: obtain corresponding virtual machine information from the virtual machine manager based on the physical resource alarm information, and obtain virtual resource alarm information corresponding to the physical resource alarm information; the alarm classifier is further configured to send the physical resource alarm information, the virtual resource alarm information, and the virtual machine information to the adapter based on the virtual machine information; and the adapter is configured to send, based on the virtual machine information, the physical resource alarm information and the virtual resource alarm information to a VNF in a virtual machine corresponding to the virtual machine information, so that the VNF reports the physical resource alarm information and the virtual resource alarm information to a corresponding element manager.

In a possible implementation, the physical resource alarm information includes a fault source identifier; the alarm classifier is specifically configured to send a query request to the virtual machine manager, where the query request includes the fault source identifier; and the virtual machine manager is configured to: query corresponding virtual machine information from second correspondence information based on the fault source identifier, and send the virtual machine information to the alarm classifier, where the second correspondence information includes at least one piece of physical resource information and virtual machine information corresponding to each piece of physical resource information.

In a possible implementation, the virtual machine information includes a virtual machine identifier and a selector identifier; the adapter includes a selector; and correspondingly, the alarm classifier is specifically configured to send the physical resource alarm information, the virtual resource alarm information, and the virtual machine information to a selector, in the adapter, corresponding to the selector identifier based on the selector identifier.

In a possible implementation, the adapter further includes at least one virtual function VF; each VF is corresponding to one VF driver; and correspondingly, the selector is specifically configured to: obtain a target VF corresponding to the virtual machine identifier from third correspondence information based on the virtual machine identifier, and send the physical resource alarm information and the virtual resource alarm information to the target VF, where the third correspondence information includes at least one VF and a virtual machine identifier corresponding to each VF; the target VF is configured to send the physical resource alarm information and the virtual resource alarm information to a VF driver corresponding to the target VF; and the VF driver corresponding to the target VF is configured to report the physical resource alarm information and the virtual resource alarm information to the VNF in the virtual machine corresponding to the virtual machine identifier, so that the VNF reports the physical resource alarm information and the virtual resource alarm information to the corresponding element manager.

According to a fifth aspect, a network functions virtualization infrastructure NFVI is provided, where the NFVI includes a memory and a processor, the memory stores code and data, and the processor runs the code stored in the memory, so that the NFVI performs the alarm information reporting method according to any possible implementation of the first aspect, or the alarm information reporting method according to any possible implementation of the second aspect.

According to the alarm information reporting method and apparatus provided in the embodiments of the present disclosure, when the physical resource alarm information at the hardware layer and/or the software layer is detected, the corresponding virtual machine information is obtained based on the physical resource alarm information, the corresponding virtual resource alarm information is obtained, and the physical resource alarm information and the virtual resource alarm information are reported to the VNF in the virtual machine corresponding to the virtual machine information. Then, the VNF reports the physical resource alarm information and the virtual resource alarm information to the corresponding element manager, so as to increase an alarm information reporting speed, reduce a reporting latency, and further accelerate alarm processing.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following clearly describes the technical solutions in embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In this specification, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Before the present disclosure is described, a network functions virtualization (NFV) technology and an NFV system architecture applied in the embodiments of the present disclosure are briefly described.

A conventional telecommunications system includes various dedicated hardware devices, and different applications use different hardware devices. With an increase of a network scale, a system becomes more complex. This brings many challenges, including development and launch of a new service, system operation and maintenance, resource utilization, and the like. To meet these challenges and utilize virtualization technologies and cloud computing technologies in the IT industry, development of NFV technologies is promoted. Various network elements used in a telecommunications network are transformed into independent applications by using the NFV technologies. The applications may be flexibly deployed on a uniform infrastructure platform constructed based on devices, such as a standard server, memory, and switch, and resource pooling and virtualization are performed on an infrastructure hardware device by using the virtualization technologies, so as to provide a virtual resource for an upper-layer application and decouple the application from hardware. In this way, virtual resources can be quickly added to each application to quickly increase a system capacity, or virtual resources can be quickly reduced to decrease a system capacity, thereby greatly improving network flexibility.

Figure 1:
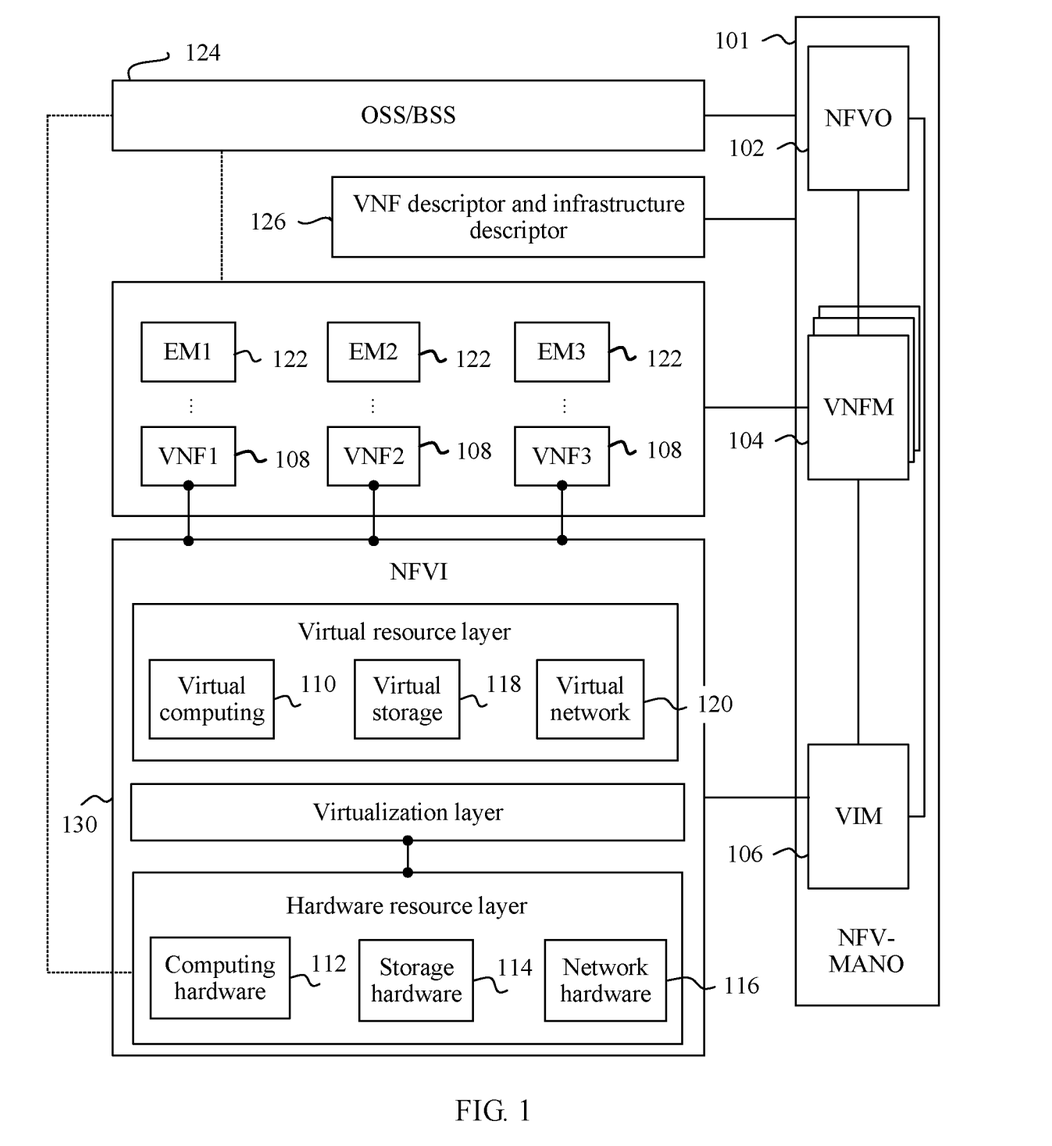
FIG. 1 is an architectural diagram of a network functions virtualization NFV system according to an embodiment of the present disclosure.

FIG. 1 is an architectural diagram of an NFV system. The NFV system may be used in various networks, for example, implemented in a data center network, an operator network, or a local area network. The NFV system includes an NFV management and orchestration system (NFV-MANO) 101, an NFV infrastructure layer (NFVI) 130, a virtualized network function (VNF) 108, an element manager (EM) 122, a VNF descriptor and infrastructure descriptor 126, and an operations support system/business support system (OSS/BSS) 124. The NFV-MANO 101 includes an NFV orchestrator (NFVO) 102, one or more VNFMs (VNFM) 104, and a virtualized infrastructure manager (VIM) 106. The NFVI 130 includes computing hardware 112, storage hardware 114, network hardware 116, a virtualization layer, virtual computing 110, virtual storage 118, and a virtual network 120.

The NFV-MANO 101 is configured to monitor and manage the VNF 108 and the NFVI 130. The NFVO 102 may implement a network service on the NFVI 130, and may execute a resource-related request from the one or more VNFMs 104, send configuration information to the VNFM 104, and collect status information of the VNF 108. In addition, the NFVO 102 may communicate with the VIM 106, to implement resource allocation and/or reservation and exchange configuration and status information of a virtualized hardware resource. The VNFM 104 may manage one or more VNFs 108. The VNFM 104 may execute various management functions such as instantiating, updating, querying, scaling, and/or terminating the VNF 108. The VIM 106 may execute a resource management function, for example, managing allocation of infrastructure resources (for example, adding resources to a virtual container), and an operating function (for example, collecting NFVI fault information). The VNFM 104 and the VIM 106 may communicate with each other to perform resource allocation and exchange configuration and status information of a virtualized hardware resource.

The NFVI 130 includes a hardware resource, a software resource, or a combination of a hardware resource and a software resource, to complete deployment of a virtualized environment. In other words, the hardware resource and the virtualization layer are used to provide a virtual resource for the VNF 108, for example, the virtual resource is used as a virtual machine or a virtual container in another form. The hardware resource includes the computing hardware 112, the storage hardware 114, and the network hardware 116. The computing hardware 112 may be existing hardware on the market and/or user-customized hardware, and is configured to provide processing and computing resources. The storage hardware 114 may be a storage capacity provided in a network or a storage capacity (which is located in a local memory of a server) residing on the storage hardware 114. In an implementation solution, resources of the computing hardware 112 and the storage hardware 114 may be centralized. The network hardware 116 may be a switch, a router, and/or any other network device that is configured to have a switching function. The network hardware 116 may span a plurality of domains, and may include a plurality of networks interconnected by one or more transmission networks.

The virtualization layer in the NFVI 130 may abstract a hardware resource from a physical layer, and decouple the VNF 108, to provide a virtual resource for the VNF 108. A virtual resource layer includes the virtual computing 110, the virtual storage 118, and the virtual network 120. The virtual computing 110 and the virtual storage 118 may be provided for the VNF 108 in a form of a virtual machine and/or another virtual container. For example, one or more VNFs 108 may be deployed on one virtual machine (VM). The virtualization layer abstracts the network hardware 116 to form the virtual network 120. The virtual network 120 may include a virtual switch, and the virtual switch is configured to provide a connection between one virtual machine and another virtual machine. In addition, the transmission network in the network hardware 116 may be virtualized by using a centralized control plane and a separate forwarding plane (for example, software-defined networking, SDN). As shown in FIG. 1, the VNFM 104 may interact with the VNF 108 and the EM 122, to manage a life cycle of the VNF and exchange configuration and status information. The VNF 108 may be configured as virtualization of at least one network function executed by using a physical network device.

Figure 2:
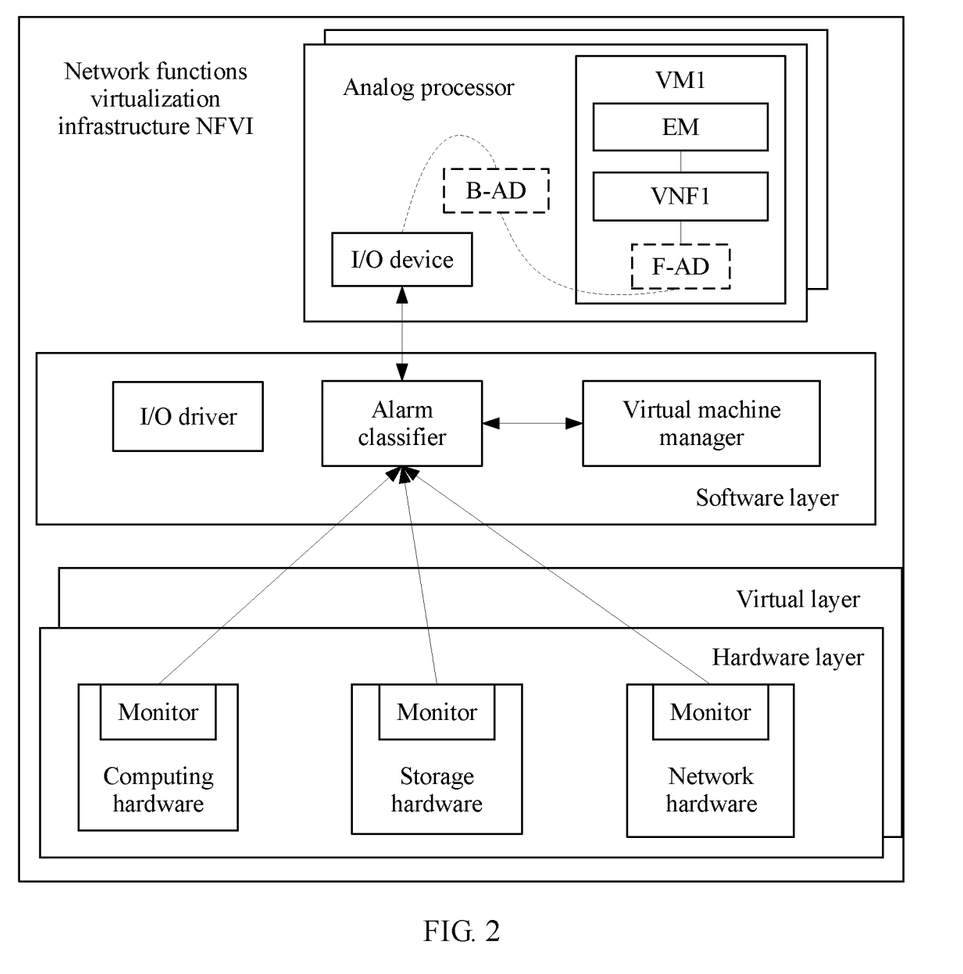
FIG. 2 is a schematic structural diagram of an NFVI according to an embodiment of the present disclosure.

FIG. 2 is a schematic structural diagram of a network functions virtualization infrastructure NFVI according to an embodiment of the present disclosure. Referring to FIG. 2, the NFVI includes a hardware layer, a virtual layer, and a software layer running at the hardware layer. The software layer includes an analog processor (e.g., a QEMU), a virtual machine runs on the analog processor, and the virtual machine includes a virtualized network function VNF. A monitor is arranged at the hardware layer, and a monitor, an alarm classifier, and a virtual machine manager (such as a kernel-based virtual machine (KVM)) are arranged at the software layer. The virtual layer is a virtual resource established based on the hardware layer, and may include virtual resources such as virtual computing, virtual storage, and a virtual network. The virtual machine manager may be configured to manage resources at the hardware layer and the virtual layer, for example, may be configured to manage a mapping relationship between a hardware resource and a virtual resource, and manage a virtual machine. The analog processor runs at the software layer. The software layer may include a plurality of analog processors, and one or more virtual machines may run on one analog processor, for example, a virtual machine VM1 running on the analog processor shown in FIG. 2. An element manager EM is configured to manage a life cycle of a virtualized network function VNF1, and the element manager and the VNF1 may be deployed on a same network element device, for example, deployed in the NFVI, or may be deployed on different network element devices. An I/O driver cooperates with an I/O device to provide an input/output function for the NFVI. Optionally, the NFVI may further include a B-AD (back-end alarm driver), and an F-AD (front-end alarm driver of a virtual machine), and one B-AD is corresponding to one F-AD of a virtual machine. Optionally, when software of the NFVI is a Linux system, the virtual machine manager may be a KVM (kernel-based virtual machine), and the analog processor may be a QEMU, namely, an analog processor of a virtual operating system.

Figure 3:
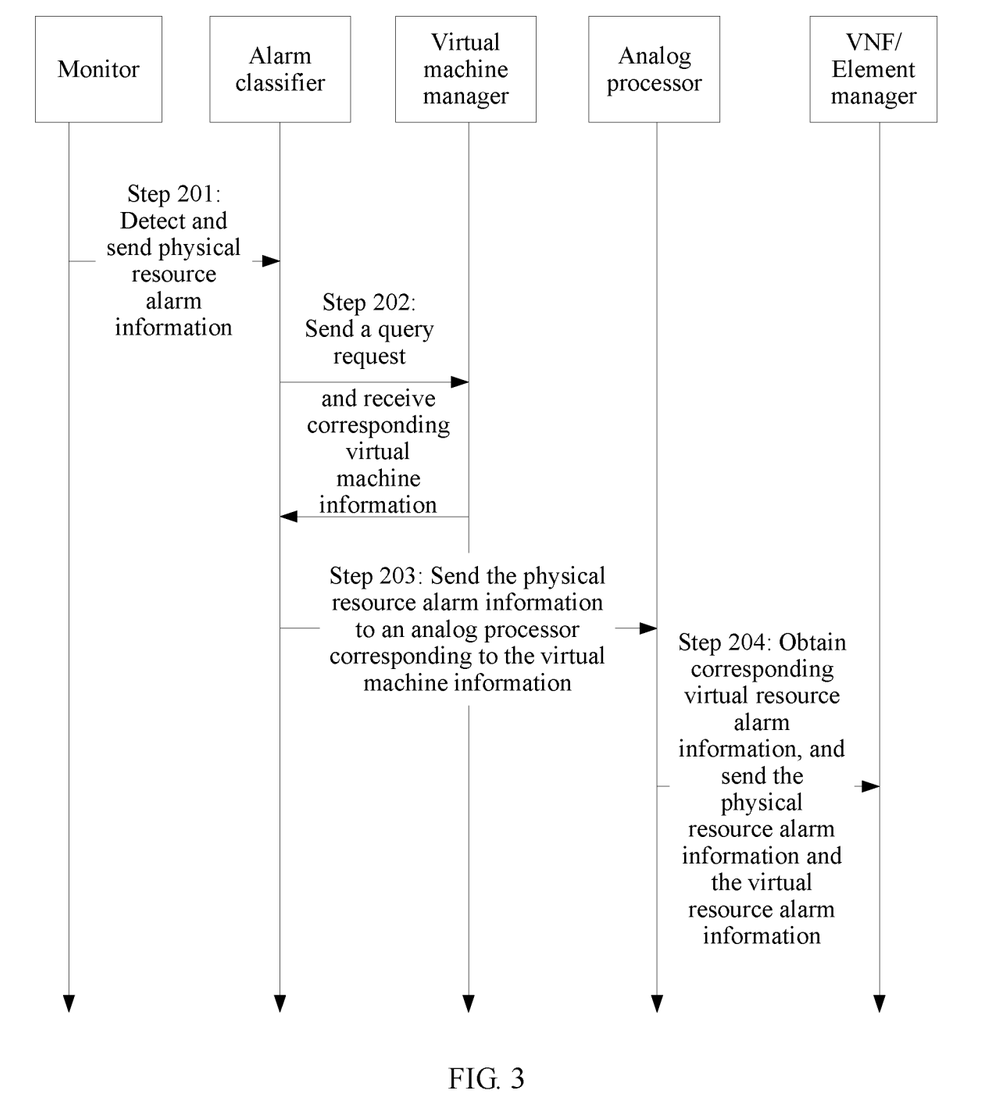
FIG. 3 is a schematic flowchart of an alarm information reporting method according to an embodiment of the present disclosure.

FIG. 3 is a schematic flowchart of an alarm information reporting method according to an embodiment of the present disclosure. The method is applied to the NFVI shown in FIG. 2. Referring to FIG. 3, the method includes the following steps.

Step 201: A monitor detects physical resource alarm information at a hardware layer and/or a software layer, and sends the physical resource alarm information to an alarm classifier.

A monitor at the hardware layer may detect a hardware resource at the hardware layer. The hardware resource may include computing hardware, storage hardware, network hardware, and the like. For example, the computing hardware may be a central processing unit (CPU), and the storage hardware may be a memory. A monitor at the software layer may detect a software resource, and the software resource may include an operating system, a virtual machine manager, and the like of the NFVI.

Specifically, when detecting an alarm of the hardware resource, the monitor at the hardware layer may send alarm information related to the hardware resource to the alarm classifier; and/or when detecting an alarm of the software resource, the monitor at the software layer may send alarm information related to the software resource to the alarm classifier. The physical resource alarm information may include the alarm information related to the hardware resource, and/or the alarm information related to the software resource.

Step 202: The alarm classifier obtains corresponding virtual machine information from a virtual machine manager based on the physical resource alarm information.

The physical resource alarm information may include an alarm identifier and a fault source identifier. The alarm identifier is used to identify a type of an alarm. The fault source identifier is used to identify a unit on which an alarm occurs, for example, a CPU, a memory, or an operating system.

Specifically, when the alarm classifier obtains the corresponding virtual machine information from the virtual machine manager based on the physical resource alarm information, the alarm classifier may send a query request to the virtual machine manager, and the query request includes the fault source identifier. The virtual machine manager queries the corresponding virtual machine information from first correspondence information based on the fault source identifier, and sends the virtual machine information to the alarm classifier. The first correspondence information includes at least one piece of physical resource information and virtual machine information corresponding to each piece of physical resource information.

A physical resource in the at least one piece of physical resource information included in the first correspondence information may include a hardware resource and/or a software resource. In this embodiment of the present disclosure, the virtual machine manager may be configured to manage a correspondence between a physical resource and a virtual machine. That is, the virtual machine manager stores at least one physical resource identifier and virtual machine information corresponding to each piece of physical resource information. The physical resource information may include a physical resource identifier, and the virtual machine information may include a virtual machine identifier.

For example, the physical resource information includes a physical resource identifier, and the virtual machine information includes a virtual machine identifier. When the alarm classifier sends a query request to the virtual machine manager and the fault source identifier included in the query request is a CPU identifier, that is, when an alarm occurs on a CPU in the NFVI, the virtual machine manager may query, from the first correspondence information, a virtual CPU in a virtual resource corresponding to the CPU on which an alarm occurs, and an identifier of a virtual machine created based on the virtual CPU. If a corresponding virtual machine identifier is a VM1, the virtual machine manager sends the virtual machine identifier VM1 to the alarm classifier.

It should be noted that each physical resource identifier may be corresponding to one or more virtual machine identifiers. For example, when an alarm occurs on the CPU in the NFVI, and a plurality of virtual machines are created based on the virtual CPU in the virtual resource, the virtual machine manager obtains a plurality of virtual machine identifiers through querying. This is not limited in this embodiment of the present disclosure.

Step 203: The alarm classifier sends, based on the virtual machine information, the physical resource alarm information to an analog processor corresponding to the virtual machine information.

The NFVI may include one or more analog processors, and one analog processor may be corresponding to one virtual machine. Therefore, when the alarm classifier sends the physical resource alarm information to a corresponding analog processor, the alarm classifier may send, based on the virtual machine information, the physical resource alarm information to the analog processor corresponding to the virtual machine information. In other words, the alarm classifier may send the physical resource alarm information to the analog processor corresponding to the virtual machine identifier.

Specifically, the alarm classifier may send the physical resource alarm information to the analog processor by using an I/O device in the analog processor corresponding to the virtual machine identifier. For a process in which the alarm classifier sends the physical resource alarm information by using the I/O device in the analog processor, refer to related technologies. This is not described in detail in this embodiment of the present disclosure.

Step 204: The analog processor obtains corresponding virtual resource alarm information based on the physical resource alarm information, and reports the physical resource alarm information and the virtual resource alarm information to a VNF in a virtual machine corresponding to the virtual machine information, so that the VNF reports the physical resource alarm information and the virtual resource alarm information to a corresponding element manager.

When an alarm occurs on the hardware resource and/or the software resource, an alarm also occurs on a virtual resource corresponding to the hardware resource and/or the software resource. For example, when an alarm occurs on a hardware resource CPU, an alarm also occurs on a corresponding virtual resource, virtual CPU. The analog processor may receive alarm information corresponding to the virtual resource, and the alarm information herein is referred to as virtual resource alarm information.

Specifically, when the analog processor receives the physical resource alarm information, the analog processor may obtain the virtual resource alarm information corresponding to the physical resource alarm information based on the physical resource alarm information, and report the physical resource alarm information together with the virtual resource alarm information to the VNF in the virtual machine corresponding to the virtual machine identifier. Then, the VNF reports the physical resource alarm information and the virtual resource alarm information to the corresponding element manager, so that alarm information of hardware and/or software at a bottom layer of the NFVI, and related virtual resource alarm information are directly reported to the element manager by the virtual machine, and a reporting path is shortened. In this way, the element manager earlier obtains and processes the alarm information at the bottom layer in a timely manner, so as to avoid impact on an NFVI service as much as possible.

Further, the virtual machine information further includes a back-end alarm driver identifier. At least one back-end alarm driver and a front-end alarm driver of a virtual machine corresponding to each back-end alarm driver are arranged on the analog processor.

Correspondingly, a process in step 203 that the alarm classifier sends, based on the virtual machine information, the physical resource alarm information to the analog processor corresponding to the virtual machine information may be specifically step 203*a*.

Step 203*a*: The alarm classifier sends the physical resource alarm information to a back-end alarm driver in the analog processor corresponding to the back-end alarm driver identifier based on the back-end alarm driver identifier.

Specifically, when the virtual machine information sent by the virtual machine manager to the alarm classifier further includes the back-end alarm driver identifier, the alarm classifier may find the corresponding analog processor based on the back-end alarm driver identifier, and find the back-end alarm driver corresponding to the back-end alarm driver identifier from at least one back-end alarm driver corresponding to the analog processor. Then, the alarm classifier sends the physical resource alarm information to the back-end alarm driver.

Correspondingly, a process in step 204 that the analog processor obtains the corresponding virtual resource alarm information based on the physical resource alarm information, and reports the physical resource alarm information and the virtual resource alarm information to the VNF in the virtual machine corresponding to the virtual machine information, so that the VNF reports the physical resource alarm information and the virtual resource alarm information to the corresponding element manager may specifically include step 204*a* to step 204*c*.

Step 204*a*: The back-end alarm driver obtains the corresponding virtual resource alarm information from the analog processor based on the physical resource alarm information.

Because the analog processor may receive the virtual resource alarm information, when the back-end alarm driver receives the physical resource alarm information, the back-end alarm driver may obtain the corresponding virtual resource alarm information from the analog processor based on the physical resource alarm information.

Step 204*b*: The back-end alarm driver sends the physical resource alarm information and the virtual resource alarm information to a front-end alarm driver in a corresponding virtual machine.

When the back-end alarm driver obtains the corresponding virtual resource alarm information, the back-end alarm driver may find the corresponding front-end alarm driver based on a preset correspondence between each of the at least one back-end alarm driver and a front-end alarm driver of a virtual machine, and send the physical resource alarm information and the virtual resource alarm information to the front-end alarm driver in the corresponding virtual machine.

Step 204c: The front-end alarm driver reports the physical resource alarm information and the virtual resource alarm information to the VNF in the virtual machine corresponding to the virtual machine identifier, so that the VNF reports the physical resource alarm information and the virtual resource alarm information to the corresponding element manager.

When the front-end alarm driver receives the physical resource alarm information and the virtual resource alarm information, the front-end alarm driver may report the physical resource alarm information together with the virtual resource alarm information to the VNF in the virtual machine corresponding to the virtual machine identifier, and the VNF sends the physical resource alarm information and the virtual resource alarm information to the corresponding element manager.

In steps 204a to 204c, a back-end alarm driver is added to the analog processor, a front-end alarm driver is added to the virtual machine, and there is a one-to-one correspondence between the back-end alarm driver and the front-end alarm driver, so that corresponding alarm information can be reported to the element manager along a preset transmission channel, and an alarm information reporting latency is reduced.

It should be noted that the virtual machine may include one or more VNFs, and when sent to the VNF corresponding to the virtual machine identifier, the physical resource alarm information and the virtual resource alarm information are sent to each VNF included in the virtual machine, and each VNF reports the physical resource alarm information and the virtual resource alarm information to an element manager corresponding to the VNF. FIG. 2 is described by using an example in which the virtual machine includes one VNF, and FIG. 2 does not constitute a limitation on the present disclosure.

In the alarm information reporting method provided in this embodiment of the present disclosure, when detecting the physical resource alarm information at the hardware layer and/or the software layer, the monitor in the NFVI sends the physical resource alarm information to the alarm classifier. The alarm classifier obtains the corresponding virtual machine information from the virtual machine manager based on the physical resource alarm information, and sends, based on the virtual machine information, the physical resource alarm information to the analog processor corresponding to the virtual machine information, so that the analog processor obtains the corresponding virtual resource alarm information based on the physical resource alarm information, reports the physical resource alarm information and the virtual resource alarm information to the VNF in the virtual machine corresponding to the virtual machine identifier. Then, the VNF reports the physical resource alarm information and the virtual resource alarm information to the corresponding element manager, so as to increase an alarm information reporting speed, reduce the reporting latency, and accelerate alarm processing.

Figure 4:
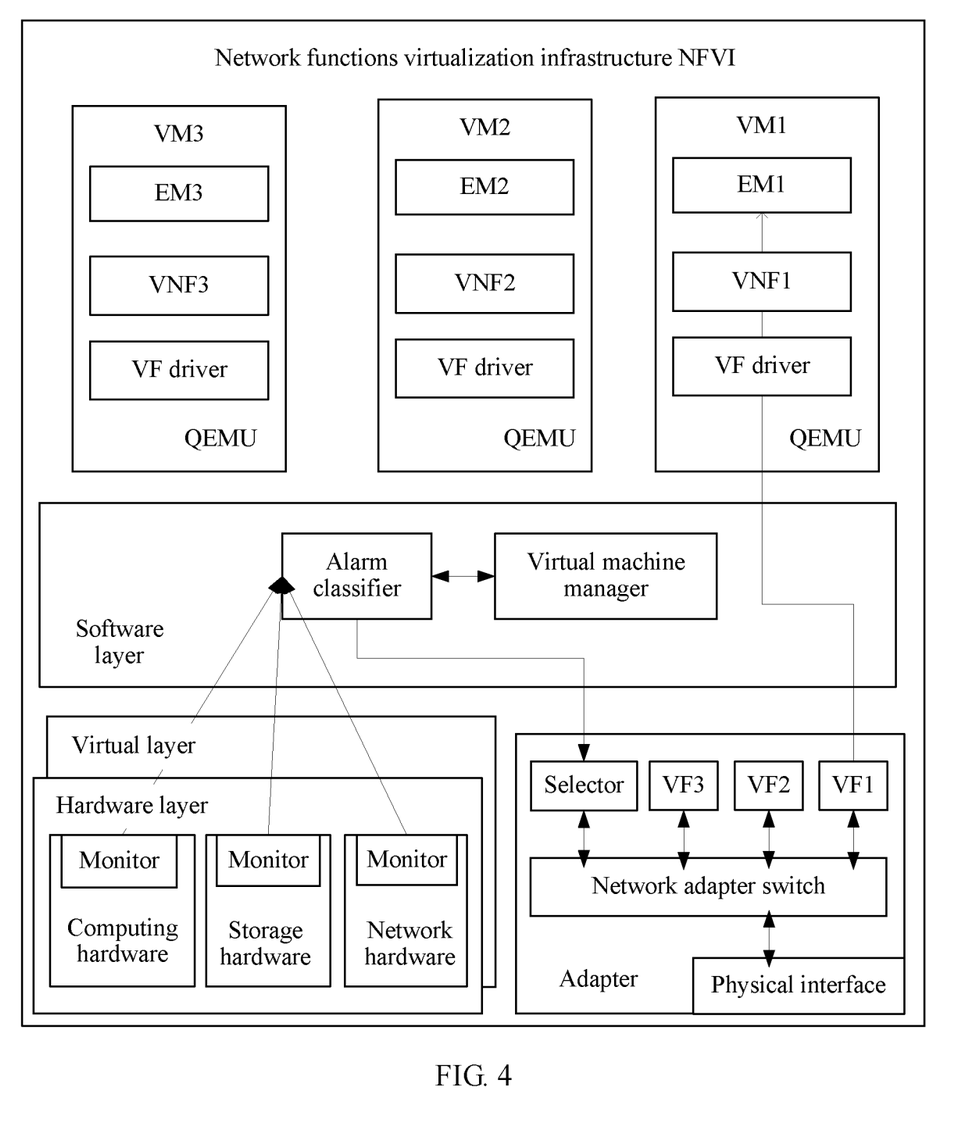
FIG. 4 is a schematic structural diagram of another NFVI according to an embodiment of the present disclosure.

FIG. 4 is a schematic structural diagram of a network functions virtualization infrastructure NFVI according to an embodiment of the present disclosure. Referring to FIG. 4, the NFVI includes a hardware layer, a virtual layer, an adapter, and a software layer running at the hardware layer. The software layer includes a virtual machine, and the virtual machine includes a VNF. A monitor is arranged at the hardware layer, and a monitor, an alarm classifier, and a virtual machine manager (such as a KVM) are arranged at the software layer. The adapter may be an SR-IOV (single-root I/O virtualization) network adapter. The SR-IOV network adapter may include a selector and one or more VFs (virtual function). The virtual layer is a virtual resource established based on the hardware layer, and may include virtual resources such as virtual computing, virtual storage, and a virtual network. The virtual machine manager may be configured to manage a resource at the hardware layer and a virtual resource, for example, may be configured to manage a mapping relationship between a hardware resource and a virtual resource, and manage virtual machine information created based on the virtual resource. A plurality of virtual machines using a QEMU as an analog processor may be created at the software layer, for example, virtual machines VM1, VM2, and VM3 shown in FIG. 4. Each virtual machine is corresponding to one element manager EM configured to manage a life cycle of a virtualized network function VNF. For example, an element manager EM1 corresponding to the VM1 is configured to manage a life cycle of a virtualized network function VNF1. Each virtual machine further includes one VF driver (virtual function driver), and each VF driver is corresponding to one VF in the SR-IOV network adapter. Optionally, when an operating system of the NFVI is a Linux system, the virtual machine manager may be a KVM (kernel-based virtual machine).

Figure 5:
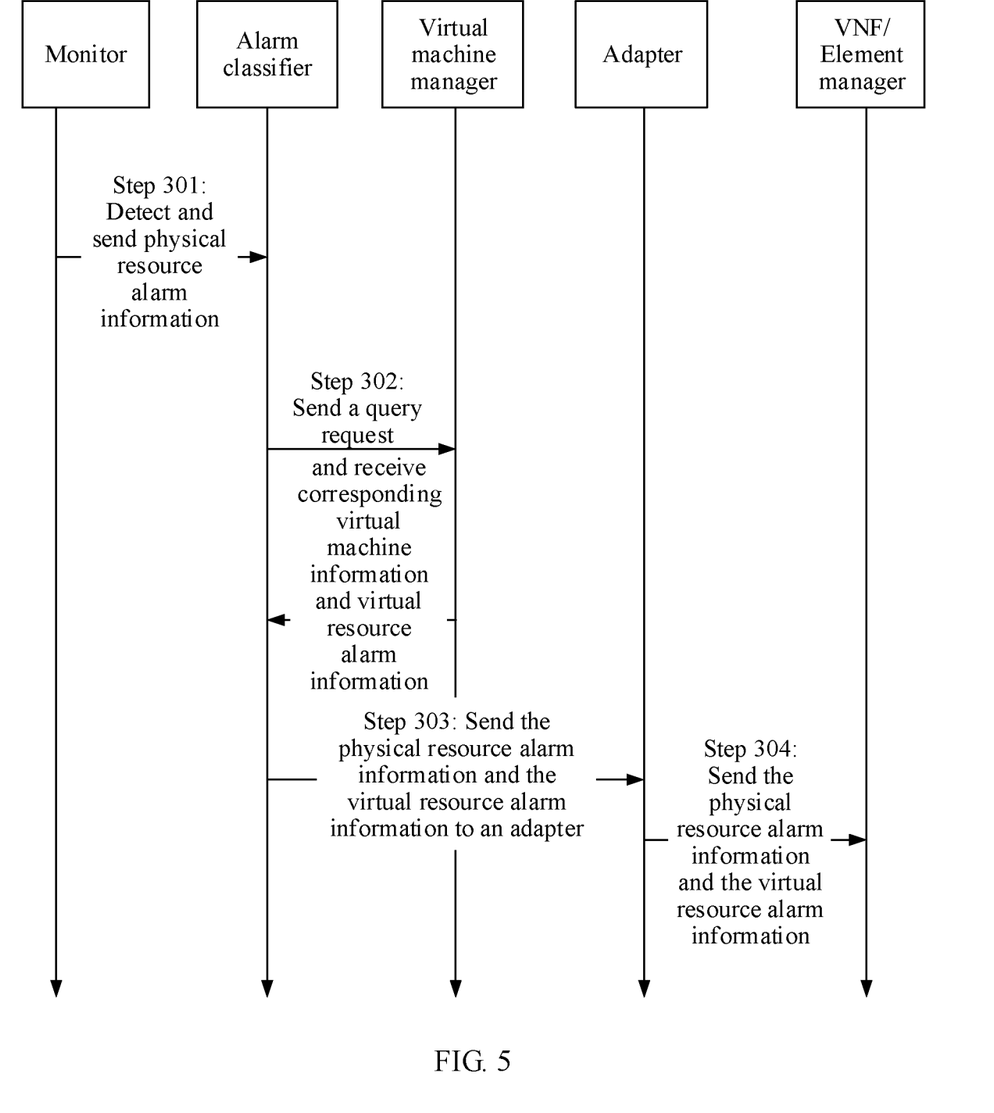
FIG. 5 is a schematic flowchart of another alarm information reporting method according to an embodiment of the present disclosure.

FIG. 5 is a schematic flowchart of an alarm information reporting method according to an embodiment of the present disclosure. The method is applied to the NFVI shown in FIG. 4. Referring to FIG. 4, the method includes the following steps.

Step 301: A monitor detects physical resource alarm information at a hardware layer and/or a software layer, and sends the physical resource alarm information to an alarm classifier.

A monitor at the hardware layer may detect a hardware resource at the hardware layer. The hardware resource may include computing hardware, storage hardware, network hardware, and the like. For example, the computing hardware may be a central processing unit (CPU), and the storage hardware may be a memory. A monitor at the software layer may detect a software resource, and the software resource may include an operating system, a virtual machine manager, and the like of the NFVI.

Specifically, when detecting an alarm of the hardware resource, the monitor at the hardware layer may send alarm information related to the hardware resource to the alarm classifier; and/or when detecting an alarm of the software resource, the monitor at the software layer may send alarm information related to the software resource to the alarm classifier. The physical resource alarm information may include the alarm information related to the hardware resource, and/or the alarm information related to the software resource.

Step 302: The alarm classifier obtains corresponding virtual machine information from a virtual machine manager based on the physical resource alarm information, and obtains virtual resource alarm information corresponding to the physical resource alarm information.

The physical resource alarm information may include an alarm identifier and a fault source identifier. The alarm identifier is used to identify a type of an alarm. The fault source identifier is used to identify a unit on which an alarm occurs, for example, a CPU, a memory, or an operating system.

Specifically, when the alarm classifier obtains the corresponding virtual machine information from the virtual machine manager based on the physical resource alarm information, the alarm classifier may send a query request to the virtual machine manager, and the query request includes the fault source identifier. The virtual machine manager queries the corresponding virtual machine information from second correspondence information based on the fault source identifier, and sends the virtual machine information to the alarm classifier. The second correspondence information includes at least one piece of physical resource information and virtual machine information corresponding to each piece of physical resource information.

A physical resource in the at least one piece of physical resource information included in the second correspondence information may include a hardware resource and/or a software resource. In this embodiment of the present disclosure, the virtual machine manager may be configured to manage a correspondence between a physical resource and a virtual machine. That is, the virtual machine manager stores at least one physical resource identifier and virtual machine information corresponding to each piece of physical resource information. The virtual machine information may include a virtual machine identifier.

It should be noted that a method in which the virtual machine manager queries the corresponding virtual machine information from the second correspondence information based on the fault source identifier is similar to that in step 202. For details, refer to the foregoing related description. Details are not described herein again in this embodiment of the present disclosure.

In addition, when an alarm occurs on the hardware resource and/or the software resource, an alarm also occurs on a virtual resource corresponding to the hardware resource and/or the software resource. For example, when an alarm occurs on a hardware resource CPU, an alarm also occurs on a corresponding virtual resource, virtual CPU. The virtual machine manager may receive alarm information corresponding to the virtual resource, and the alarm information herein is referred to as virtual resource alarm information. Therefore, when the virtual machine manager receives the query request, the query request may alternatively include an alarm identifier. An analog processor may obtain the virtual resource alarm information corresponding to the physical resource alarm information based on the alarm identifier, and send the virtual resource alarm information together with the virtual machine information to the alarm classifier.

Step 303: The alarm classifier sends the physical resource alarm information, the virtual resource alarm information, and the virtual machine information to an adapter based on the virtual machine information.

Optionally, the virtual machine information may include a virtual machine identifier and a selector identifier, and the adapter includes a selector. Specifically, when the virtual machine information may include the virtual machine identifier and the selector identifier, the alarm classifier may send the physical resource alarm information, the virtual resource alarm information, and the virtual machine information to a selector, in the adapter, corresponding to the selector identifier based on the selector identifier.

Step 304: The adapter sends, based on the virtual machine information, the physical resource alarm information and the virtual resource alarm information to a VNF in a virtual machine corresponding to the virtual machine information, so that the VNF reports the physical resource alarm information and the virtual resource alarm information to a corresponding element manager.

The adapter may further include at least one virtual function VF. Each VF is corresponding to one VF driver. Correspondingly, a process in which the adapter sends the physical resource alarm information and the virtual resource alarm information to the element manager based on the virtual machine information may include steps I to III, which are specifically as follows:

Step I: The selector obtains a target VF corresponding to the virtual machine identifier from third correspondence information based on the virtual machine identifier, and sends the physical resource alarm information and the virtual resource alarm information to the target VF, where the third correspondence information includes at least one VF and a virtual machine identifier corresponding to each VF.

Step II: The target VF sends the physical resource alarm information and the virtual resource alarm information to a VF driver of a virtual machine corresponding to the target VF.

Step III: The VF driver corresponding to the target VF reports the physical resource alarm information and the virtual resource alarm information to the VNF in the virtual machine corresponding to the virtual machine information, so that the VNF reports the physical resource alarm information and the virtual resource alarm information to the corresponding element manager.

When the VF driver corresponding to the target VF receives the physical resource alarm information and the virtual resource alarm information, the VF driver may report the physical resource alarm information together with the virtual resource alarm information to the VNF in the virtual machine corresponding to the virtual machine identifier, and the VNF sends the physical resource alarm information and the virtual resource alarm information to the corresponding element manager.

In steps I to III, the selector in the adapter selects a corresponding VF channel by using the virtual machine identifier, and sends the physical resource alarm information and the virtual resource alarm information at a bottom layer to the corresponding VF driver. That is, the physical resource alarm information and the virtual resource alarm information are sent to the VNF in the virtual machine corresponding to the virtual machine identifier by using a VF-VF driver channel, and the VNF sends the physical resource alarm information and the virtual resource alarm information to the corresponding element manager. In this way, the element manager obtains alarm information at the bottom layer as soon as possible, so as to avoid impact on an NFVI service as much as possible.

It should be noted that the virtual machine may include one or more VNFs, and when sent to the VNF corresponding to the virtual machine identifier, the physical resource alarm information and the virtual resource alarm information are sent to each VNF included in the virtual machine, and each VNF reports the physical resource alarm information and the virtual resource alarm information to an element manager corresponding to the VNF. FIG. 4 is described by using an example in which the virtual machine includes one VNF, and FIG. 4 does not constitute a limitation on the present disclosure.

In the alarm information reporting method provided in this embodiment of the present disclosure, when detecting the physical resource alarm information at the hardware layer and/or the software layer, the monitor in the NFVI sends the physical resource alarm information to the alarm classifier. The alarm classifier obtains the corresponding virtual machine information and the corresponding virtual resource alarm information from the virtual machine manager based on the physical resource alarm information, and sends the physical resource alarm information and the virtual resource alarm information to the adapter based on the virtual machine information. Then, the adapter reports the physical resource alarm information and the virtual resource alarm information to the VNF in the virtual machine corresponding to the virtual machine identifier based on the virtual machine information, and the VNF reports the physical resource alarm information and the virtual resource alarm information to the corresponding element manager, so that the element manager obtains the alarm information at the bottom layer as soon as possible, so as to increase an alarm information reporting speed and further accelerate alarm processing.

The foregoing mainly describes the solutions provided in the embodiments of the present disclosure from a perspective of interaction between network elements. It may be understood that, to implement the foregoing functions, network elements, such as the NFVI and the element manager, include a corresponding hardware structure and/or software module for performing each function. A person of ordinary skill in the art should easily be aware that, in combination with the examples described in the embodiments disclosed in this specification, network elements and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In an embodiment of the present disclosure, functional module division may be performed on an NFVI and the like according to the foregoing method examples. For example, each functional module may be obtained through division based on a corresponding function, or two or more functions may be integrated into one processing module. The integrated module may be implemented in a form of hardware, or may be implemented in a form of a software functional module. It should be noted that the module division in the embodiment of the present disclosure is an example, and is merely logical function division. There may be another division manner in an actual implementation.

When each functional module is obtained through division based on a corresponding function, FIG. 2 is a possible schematic structural diagram of the NFVI in the foregoing embodiment. The NFVI includes a monitor, an alarm classifier, a virtual machine manager, an analog processor, and a virtual machine, and the virtual machine includes a VNF. The monitor is configured to support the NFVI in performing the process 201 in FIG. 3. The alarm classifier is configured to support the NFVI in performing the processes 202 and 203 in FIG. 3. The analog processor is configured to support the NFVI in performing the process 204 in FIG. 3. Further, optionally, the analog processor includes a back-end alarm driver B-AD and a front-end alarm driver F-AD. The B-AD is configured to support the NFVI in performing the processes 204a and 204b in the embodiment in FIG. 3. The F-AD is configured to support the NFVI in performing the process 204c in the embodiment in FIG. 3. The VNF is configured to support the NFVI in performing the process, in the embodiment in FIG. 3, of sending the physical resource alarm information and the virtual resource alarm information to the corresponding element manager. All related content of the steps in the foregoing method embodiments may be cited in function descriptions of corresponding functional modules, and details are not described herein.

When each functional module is obtained through division based on a corresponding function, FIG. 5 is a possible schematic structural diagram of the NFVI in the foregoing embodiment. The NFVI includes a monitor, an alarm classifier, a virtual machine manager, an adapter, and a virtual machine, and the virtual machine includes a VNF. The monitor is configured to support the NFVI in performing a process 301 in FIG. 5. The alarm classifier is configured to support the NFVI in performing processes 302 and 303 in FIG. 5. The adapter is configured to support the NFVI in performing a process 304 in FIG. 5. Further, optionally, the adapter includes a selector and a VF. The NFVI further includes a VF driver corresponding to the VF. The selector corresponding to a selector identifier is configured to support the NFVI in performing the process in step I of the embodiment in FIG. 5. A target VF corresponding to a virtual machine identifier is configured to support the NFVI in performing the process in step II of the embodiment in FIG. 5. A VF driver corresponding to the target VF is configured to support the NFVI in performing the process in step III of the embodiment in FIG. 5. The VNF is configured to support the NFVI in performing the process, in the embodiment in FIG. 5, of sending the physical resource alarm information and the virtual resource alarm information to the corresponding element manager. All related content of the steps in the foregoing method embodiments may be cited in function descriptions of corresponding functional modules, and details are not described herein.

Figure 6:
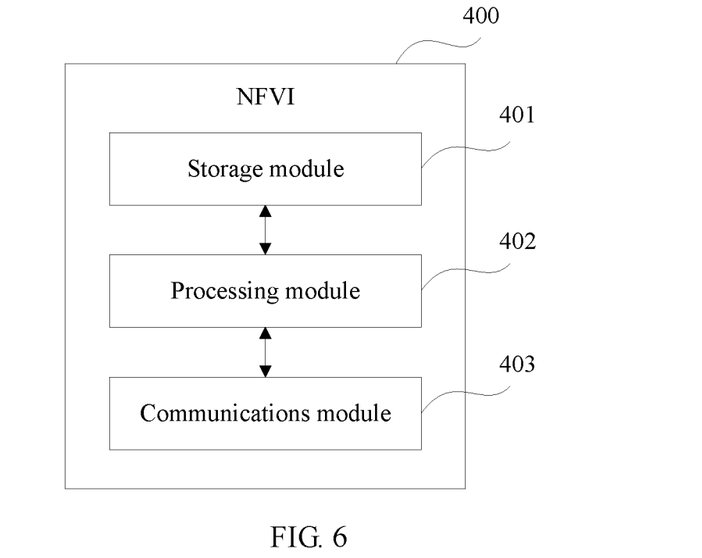
FIG. 6 is a schematic structural diagram of an NFVI according to an embodiment of the present disclosure.

When an integrated unit is used, FIG. 6 is a possible schematic structural diagram of the NFVI in the foregoing embodiment. An NFVI 400 includes a processing module 402 and a communications module 403. The processing module 402 is configured to control and manage an action of the NFVI. For example, the processing module 402 is configured to support the NFVI in performing the processes 201, 202, and 203 in FIG. 3, or is configured to support the NFVI in performing the processes 301, 302, and 303 in FIG. 5, and/or is configured to perform another process of the technology described in this specification. The communications module 403 is configured to support communication between the NFVI and another network entity. For example, the communications module 403 is configured to support communication between the NFVI and an element manager, and the like. The NFVI may further include a storage module 401, configured to store program code and data of the NFVI.

The processing module 402 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The communications module 403 may be a transceiver, a transceiver circuit, a communications interface, or the like. The storage module 401 may be a memory.

Figure 7:
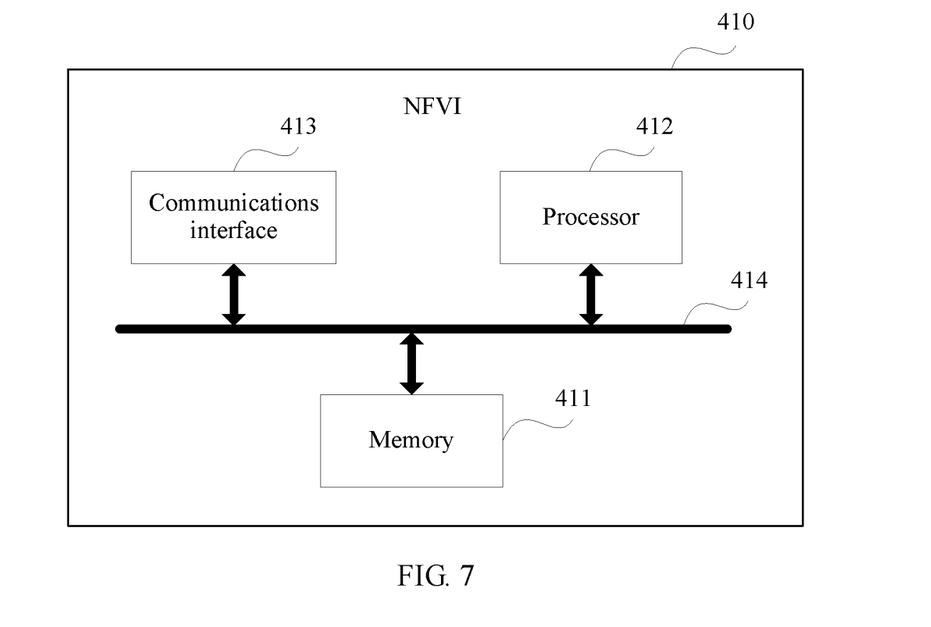
FIG. 7 is a schematic structural diagram of another NFVI according to an embodiment of the present disclosure.

When the processing module 402 is a processor, the communications module 403 is a communications interface, and the storage module 401 is a memory, the NFVI in this embodiment of the present disclosure may be an NFVI shown in FIG. 7.

Referring to FIG. 7, the NFVI 410 includes a processor 412, a communications interface 413, a memory 411, and a bus 414. The communications interface 413, the processor 412, and the memory 411 are interconnected by using the bus 414. The bus 414 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

According to the NFVI provided in this embodiment of the present disclosure, when physical resource alarm information at a hardware layer and/or a software layer is detected, corresponding virtual machine information is obtained based on the physical resource alarm information, corresponding virtual resource alarm information is obtained, and the physical resource alarm information and the virtual resource alarm information are reported to a VNF in a virtual machine corresponding to the virtual machine information. Then, the VNF reports the physical resource alarm information and the virtual resource alarm information to a corresponding element manager, so as to increase an alarm information reporting speed, reduce a reporting latency, and further accelerate alarm processing.

Finally, it should be noted that the foregoing embodiments are merely intended for describing the technical solutions of the present disclosure other than limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. An alarm information reporting method for use in a network functions virtualization infrastructure (NFVI), wherein the NFVI comprises a hardware layer, a virtual layer, and a software layer running at the hardware layer, the software layer comprises one or more analog processors each of which is configured to run a virtual machine comprising a virtualized network function (VNF), a monitor is arranged at the hardware layer, and the monitor, an alarm classifier, and a virtual machine manager are arranged at the software layer, the method comprising:

detecting, by the monitor, physical resource alarm information indicating an alarm of a first physical resource at the hardware layer or at the software layer and sending the physical resource alarm information to the alarm classifier;

obtaining, by the alarm classifier from the virtual machine manager, virtual machine information indicating a first virtual machine based on the physical resource alarm information indicating the alarm of the first physical resource, the first virtual machine corresponding to the first physical resource;

sending, by the alarm classifier, the physical resource alarm information to a first analog processor of the one or more analog processors based on a correspondence between the first analog processor and the first virtual machine; and obtaining, by the first analog processor, virtual resource alarm information indicating an alarm of a virtual resource corresponding to the first physical resource based on the physical resource alarm information indicating the alarm of the first physical resource, and reporting the physical resource alarm information and the virtual resource alarm information to the VNF in the first virtual machine corresponding to the virtual machine information, to enable the VNF to report the physical resource alarm information and the virtual resource alarm information to an element manager corresponding to the first virtual machine.

2. The method according to claim 1, wherein:
the physical resource alarm information comprises a fault source identifier; and
obtaining, by the alarm classifier, the virtual machine information indicating the first virtual machine comprises:
sending, by the alarm classifier, a query request to the virtual machine manager, wherein the query request comprises the fault source identifier; and
querying, by the virtual machine manager, the virtual machine information from first correspondence information based on the fault source identifier and sending the virtual machine information to the alarm classifier, wherein the first correspondence information comprises at least one piece of physical resource information and virtual machine information corresponding to each piece of physical resource information, and wherein the virtual machine information comprises a virtual machine identifier corresponding to the first virtual machine.

3. The method according to claim 2, wherein:
the virtual machine information further comprises a back-end alarm driver identifier;
at least one back-end alarm driver and a front-end alarm driver of a virtual machine corresponding to each back-end alarm driver are arranged on first analog processor;
sending, by the alarm classifier, the physical resource alarm information to the first analog processor comprises:
sending, by the alarm classifier, the physical resource alarm information to a first back-end alarm driver in the first analog processor corresponding to the back-end alarm driver identifier based on the back-end alarm driver identifier; and
obtaining, by the first analog processor, the virtual resource alarm information based on the physical resource alarm information and reporting the physical resource alarm information and the virtual resource alarm information to the VNF in the first virtual machine corresponding to the virtual machine information to enable the VNF to report the physical resource alarm information and the virtual resource alarm information to the element manager comprises:
obtaining, by the first back-end alarm driver, the virtual resource alarm information from the first analog processor based on the physical resource alarm information,
sending, by the first back-end alarm driver, the physical resource alarm information and the virtual resource alarm information to a first front-end alarm driver in the first virtual machine, and
reporting, by the first front-end alarm driver, the physical resource alarm information and the virtual resource alarm information to the VNF in the first virtual machine corresponding to the virtual machine identifier to enable the VNF to report the physical resource alarm information and the virtual resource alarm information to the element manager.

4. An alarm information reporting apparatus, comprising:
a monitor configured to detect physical resource alarm information indicating an alarm of a first physical resource at a hardware layer or at a software layer of the alarm information reporting apparatus;
an alarm classifier configured to:
   receive the physical resource alarm information indicating the alarm of the first physical resource from the monitor,
   obtain, from a virtual machine manager, virtual machine information indicating a first virtual machine based on the physical resource alarm information indicating the alarm of the first physical resource, the first virtual machine corresponding to the first physical resource, and
   send the physical resource alarm information to a first analog processor based on a correspondence between the first analog processor and the first virtual machine; and
wherein the first analog processor is configured to:
   obtain virtual resource alarm information indicating an alarm of a virtual resource corresponding to the first physical resource based on the physical resource alarm information indicating the alarm of the first physical resource, and
   report the physical resource alarm information and the virtual resource alarm information to a virtualized network function (VNF) in the first virtual machine corresponding to the virtual machine information to enable the VNF to report the physical resource alarm information and the virtual resource alarm information to an element manager corresponding to the first virtual machine.

5. The apparatus according to claim 4, wherein:
the physical resource alarm information comprises a fault source identifier;
the alarm classifier is configured to send a query request to the virtual machine manager, wherein the query request comprises the fault source identifier; and
the virtual machine manager is configured to:
   query the virtual machine information from first correspondence information based on the fault source identifier, and
   send the virtual machine information to the alarm classifier, wherein the first correspondence information comprises at least one piece of physical resource information and virtual machine information corresponding to each piece of physical resource information, and wherein the virtual machine information comprises a virtual machine identifier corresponding to the first virtual machine.

6. The apparatus according to claim 5, wherein:
the virtual machine information further comprises a back-end alarm driver identifier;
at least one back-end alarm driver and a front-end alarm driver of a virtual machine corresponding to each back-end alarm driver are arranged on the first analog processor;
the alarm classifier is further configured to send, based on the back-end alarm driver identifier, the physical resource alarm information to a first back-end alarm driver in the first analog processor corresponding to the back-end alarm driver identifier;

the first back-end alarm driver is configured to:
   obtain the virtual resource alarm information from the first analog processor based on the physical resource alarm information, and
   send the physical resource alarm information and the virtual resource alarm information to a first front-end alarm driver in the first virtual machine; and
the first front-end alarm driver is configured to report the physical resource alarm information and the virtual resource alarm information to the VNF in the first virtual machine corresponding to the virtual machine identifier to enable the VNF to report the physical resource alarm information and the virtual resource alarm information to the element manager.

7. An alarm information reporting apparatus, comprising:
a monitor configured to detect physical resource alarm information indicating an alarm of a first physical resource at a hardware layer or a software layer of the alarm information reporting apparatus;
an alarm classifier configured to:
   receive the physical resource alarm information indicating the alarm of the first physical resource from the monitor,
   obtain, from a virtual machine manager, virtual machine information indicating a first virtual machine based on the physical resource alarm information indicating the alarm of the first physical resource, the first virtual machine corresponding to the first physical resource, and obtain virtual resource alarm information indicating an alarm of a virtual resource corresponding to the first physical resource based on the physical resource alarm information, and
   send the physical resource alarm information, the virtual resource alarm information, and the virtual machine information to an adapter; and
wherein the adapter is configured to send, based on the virtual machine information indicating the first virtual machine, the physical resource alarm information and the virtual resource alarm information to a virtualized network function (VNF) in the first virtual machine corresponding to the virtual machine information to enable the VNF to report the physical resource alarm information and the virtual resource alarm information to a element manager corresponding to the first virtual machine.

8. The apparatus according to claim 7, wherein:
the physical resource alarm information comprises a fault source identifier;
the alarm classifier is configured to send a query request to the virtual machine manager, wherein the query request comprises the fault source identifier; and
the virtual machine manager is configured to:
   query the virtual machine information from second correspondence information based on the fault source identifier, and
   send the virtual machine information to the alarm classifier, wherein the second correspondence information comprises at least one piece of physical resource information and virtual machine information corresponding to each piece of physical resource information.

9. The apparatus according to claim 8, wherein:
the adapter comprises a selector;

the virtual machine information comprises a first virtual machine identifier corresponding to the first virtual machine and a selector identifier corresponding to the selector; and the alarm classifier is configured to send the physical resource alarm information, the virtual resource alarm information, and the virtual machine information to the selector corresponding to the selector identifier.

10. The apparatus according to claim 9, wherein:

the adapter further comprises at least one virtual function (VF), and each VF of the at least one VF corresponds to one VF driver;

the selector is configured to:

select a target VF corresponding to the first virtual machine identifier from third correspondence information based on the first virtual machine identifier, and send the physical resource alarm information and the virtual resource alarm information to the target VF, wherein the third correspondence information comprises at least one VF and a virtual machine identifier corresponding to each VF;

wherein the target VF is configured to send the physical resource alarm information and the virtual resource alarm information to a VF driver corresponding to the target VF; and wherein the VF driver corresponding to the target VF is configured to report the physical resource alarm information and the virtual resource alarm information to the VNF in the first virtual machine corresponding to the virtual machine identifier to enable the VNF to report the physical resource alarm information and the virtual resource alarm information to the element manager.

* * * * *